(12) United States Patent
Youm (10) Patent No.: US 11,670,762 B2
(45) Date of Patent: Jun. 6, 2023

(54) NEGATIVE ACTIVE MATERIAL FOR RECHARGEABLE LITHIUM BATTERY AND RECHARGEABLE LITHIUM BATTERY INCLUDING SAME

(71) Applicant: Samsung SDI Co., Ltd., Yongin-si (KR)

(72) Inventor: Chul Youm, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 143 days.

(21) Appl. No.: 17/176,592

(22) Filed: Feb. 16, 2021

(65) Prior Publication Data

US 2021/0265626 A1 Aug. 26, 2021

(30) Foreign Application Priority Data

Feb. 24, 2020 (KR) ........................ 10-2020-0022393

(51) Int. Cl.
*H01M 4/38* (2006.01)
*H01M 4/36* (2006.01)
*H01M 4/48* (2010.01)
*H01M 4/583* (2010.01)
*H01M 10/0525* (2010.01)
*H01M 10/44* (2006.01)
*H01M 4/02* (2006.01)

(52) U.S. Cl.
CPC ........... *H01M 4/386* (2013.01); *H01M 4/366* (2013.01); *H01M 4/48* (2013.01); *H01M 4/583* (2013.01); *H01M 10/0525* (2013.01); *H01M 10/44* (2013.01); *H01M 2004/021* (2013.01); *H01M 2004/027* (2013.01); *H01M 2004/028* (2013.01)

(58) Field of Classification Search
CPC ............ H01M 10/0525; H01M 10/44; H01M 2004/021; H01M 2004/027; H01M 2004/028; H01M 4/134; H01M 4/366; H01M 4/386; H01M 4/48; H01M 4/483; H01M 4/583; H01M 4/62; Y02E 60/10
See application file for complete search history.

(56) References Cited

U.S. PATENT DOCUMENTS

| 2019/0190020 A1 | 6/2019 | Park et al. |
| 2020/0280059 A1 | 9/2020 | Choi et al. |
| 2022/0158175 A1* | 5/2022 | Zhang ..................... H01M 4/62 |

FOREIGN PATENT DOCUMENTS

| KR | 10-1773719 B1 | 9/2017 |
| KR | 10-2018-0138226 A | 12/2018 |
| KR | 10-2019-0029044 A | 3/2019 |

* cited by examiner

*Primary Examiner* — Victoria H Lynch
(74) *Attorney, Agent, or Firm* — Lewis Roca Rothgerber Christie LLP (57) ABSTRACT

Disclosed are a negative active material for a rechargeable lithium battery and a rechargeable lithium battery including the same. The negative active material includes: a silicon particle core comprising a silicon particle having a particle size in a micrometer range; an oxide layer having a thickness in a range of about 65 nm to about 450 nm, on the silicon particle core; and a conductive layer on the oxide layer.

9 Claims, 4 Drawing Sheets

NEGATIVE ACTIVE MATERIAL FOR RECHARGEABLE LITHIUM BATTERY AND RECHARGEABLE LITHIUM BATTERY INCLUDING SAME

CROSS-REFERENCE TO RELATED APPLICATION

This application claims priority to and the benefit of Korean Patent Application No. 10-2020-0022393 filed in the Korean Intellectual Property Office on Feb. 24, 2020, the entire contents of which are hereby incorporated by reference.

BACKGROUND

1. Field

Embodiments of this disclosure relate to a negative active material for a rechargeable lithium battery and a rechargeable lithium battery including the same.

2. Description of the Related Art

A rechargeable lithium battery has recently drawn attention as a power source for small portable electronic devices. The rechargeable lithium battery uses an organic electrolyte solution and thereby has twice or more a discharge voltage than an existing battery using an alkali aqueous solution, and accordingly, has high energy density.

As for a positive active material of a rechargeable lithium battery, a lithium-transition metal oxide having a structure capable of intercalating lithium ions, such as $LiCoO_2$, $LiMn_2O_4$, $LiNi_{1-x}Co_xO_2$ ($0<x<1$), and the like has been used.

As a negative active material, various carbon-based negative active materials capable of intercalating/deintercalating lithium ions such as artificial graphite, natural graphite, and hard carbon have been mainly used, and recently, a non-carbon-based negative electrode active material such as silicon-based or tin-based material has been researched in order to obtain high capacity.

The above information disclosed in this Background section is only for enhancement of understanding of the background of the present disclosure, and therefore, it may contain information that does not form the prior art that is already known in this country to a person of ordinary skill in the art.

SUMMARY

One embodiment of the present disclosure provides a negative active material for a rechargeable lithium battery exhibiting excellent initial efficiency and a stable cycle-life characteristics.

Another embodiment provides a rechargeable lithium battery including the negative active material.

One embodiment provides a negative active material for a rechargeable lithium battery including a silicon particle core including a silicon particle having a particle size in a micrometer range; an oxide layer having a thickness in a range of about 65 nm to about 450 nm, on the silicon particle core; and a conductive layer on the oxide layer.

The silicon particle core may have a particle size in a range of about 1 μm to about 10 μm.

The oxide layer may have a thickness in a range of about 80 nm to about 450 nm.

The oxide layer may include a silicon oxide.

The oxide layer may be continuously on the surface of the core in a form of a layer.

Another embodiment provides a rechargeable lithium battery including: a negative electrode including the negative active material; a positive electrode; and an electrolyte.

The negative active material may further include a carbon-based negative active material.

Example features of other embodiments of the present disclosure are included in the following detailed description.

A negative active material for a rechargeable lithium battery according to one embodiment may provide a rechargeable lithium battery exhibiting excellent initial efficiency and a stable cycle-life characteristic.

BRIEF DESCRIPTION OF THE DRAWINGS

The accompanying drawings, together with the specification, illustrate embodiments of the subject matter of the present disclosure, and, together with the description, serve to explain principles of embodiments of the subject matter of the present disclosure.

DETAILED DESCRIPTION

Hereinafter, embodiments of the present disclosure are described in more detail.

However, these embodiments are exemplary, and the present disclosure is not limited thereto and the scope of the present disclosure is defined by the scope of the following claims, and equivalents thereof.

Figure 1:
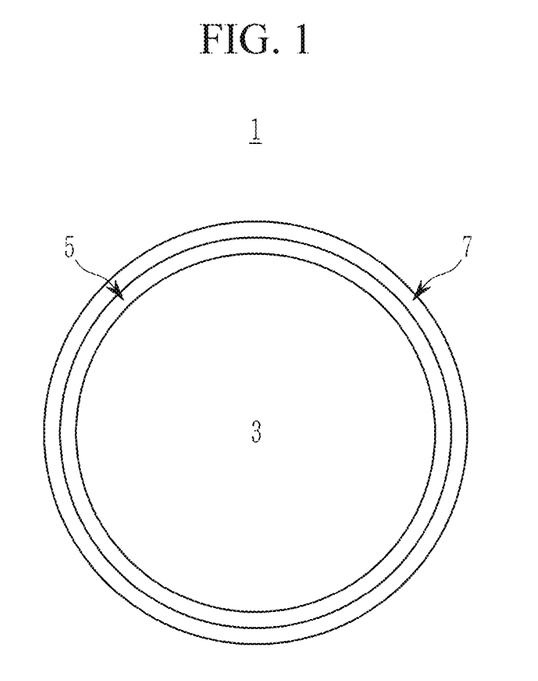
FIG. 1 is a schematic view showing a structure of the negative active material according to one embodiment.

A negative active material for a rechargeable lithium battery includes: a silicon particle core including a silicon particle having a particle size in a micrometer range, for example, a silicon particle core having a particle size in a micrometer range; an oxide layer on the silicon particle core, the oxide layer having a thickness in a range of about 65 nm to about 450 nm; and a conductive layer on the oxide layer. FIG. 1 schematically shows a structure of an embodiment of such a negative active material. As shown in FIG. 1, the negative active material 1 includes a silicon particle 3, an oxide layer 5 on a surface of the core 3, and a conductive layer 7 on the oxide layer 5.

The oxide layer may include oxides continuously on the surface of the core in the form of a layer. If the oxide layer is in a form of an island, the oxide layer does not substantially completely cover the core, for example, the core is partially exposed, causing direct contact (e.g., physical contact) with the electrolyte, thereby causing an undesirable or unwanted side reaction. Furthermore, when the oxide layer includes grooves such as dimples, for example, when the oxide layer includes protrusions and depressions, lithium may be unevenly distributed during charging so that the active material particles may be broken due to an expansion stress change.

The silicon particle core may include silicon particles having a particle size in a range of micrometers. For example, the silicon particle core may include silicon particles having a particle size in a range of about 1 μm to about 10 μm. The size of the silicon particles of the silicon particle core may be an average particle size. As used herein, the term "average particle size" refers to a particle diameter which corresponds to 50% from the smallest particle, also referred to as "D50," when the total number of particles is 100%, in a distribution curve accumulated from the smallest particle size to the largest particle size, For example, as used herein, the term "average particle size" may refer to the average particle diameter (D50), which refers to a diameter of particles having a cumulative volume of 50% by volume in the particle size distribution. The average particle size D50 may be determined by any suitable methods generally used in the art. In some embodiments, the average particle size D50 may be determined by using a particle size analyzer, by using a transmission electron microscope photograph (image), and/or by using a scanning electron microscope photograph (image). In some embodiments, the D50 may be readily obtained by measuring with a measurement device using dynamic light-scattering, and analyzing the resulting data to count numbers of particles to each particle size and to determine the result therefrom.

In some embodiments, the size of the silicon particles of the silicon particle core may be included in a range of about 1 μm to about 10 μm in a particle size distribution in a range of about 10% to about 90%

When the particle size of the silicon particle is included in the range of micrometers, and for example, in the above range, it may utilize high capacity of silicon, and it more effectively imparts the effect of inhibiting (or reducing a likelihood or degree of) a reaction with the electrolyte due to the oxide layer, if the oxide layer is included.

If the silicon particles of the silicon particle core are included to have a particle size in a range of nanometers, for example, includes a range smaller than a micrometer range, and for example, the silicon particles of the silicon particle core have a particle size less than 1 μm, the effect from the oxide layer formation cannot be obtained (or substantially cannot be obtained). In some embodiments, if the silicon particles of the silicon particle core have a particle size that is larger than a micrometer range, for example, larger than 10 μm, the diffusion distance of ions to the inside of the silicon particle core is increased, and thus, the resistance is increased and the particle breakage is increased due to volume expansion of the active material during charging and discharging, to continuously (or substantially continuously) cause the side reaction with the electrolyte due to particle breakage of the silicon particle core, and resultantly, the cycle-life characteristics may be deteriorated or reduced.

The thickness of the oxide layer on the surface of the silicon particle core may be in a range of about 65 nm to about 450 nm, or about 80 nm to about 450 nm. The oxide layer may prevent (or reduce a likelihood or degree of) undesirable or unwanted reactions from contact (e.g., physical contact) of the silicon particle core with the electrolyte. For example, the oxide layer may act as a protection layer that protects the silicon particle core. Furthermore, although the oxide layer is a dense coating layer having high density, and when the thickness of the oxide layer satisfies the range, lithium ions may be suitably passed. The volume of the silicon particle core may be changed by almost 4 times during charging and discharging, and the volume change may cause breakage of the silicon particle to cause contact (e.g., physical contact) of newly exposed surfaces with the electrolyte to cause a reaction. Such problems may be prevented or mitigated by inhibiting or reducing the volume change of the silicon particle core when the thickness of the oxide layer is within the above range. Furthermore, the oxide layer physically covers the silicon particle core, thereby preventing (or reducing a likelihood or degree of) direct contact (e.g., physical contact) between the silicon particle core and the electrolyte.

If the oxide layer is thinner than the above range, it is difficult to suppress or reduce the volume change of the silicon particle core during charging and discharging, thereby causing shortcomings such as breakage of the active material particle, etc., and allowing the exposure of the new surface of the silicon particle core due to particle breakage to continuously (e.g., substantially continuously) cause the side reaction with the electrolyte, so that the cycle-life characteristics may be deteriorated or reduced. In some embodiments, if the oxide layer is thicker than the above range, it is difficult to permeate lithium ions during charging and discharging to reduce the initial efficiency and to increase irreversible capacity.

The thickness of the oxide layer may be confirmed by measuring utilizing a transmission electron microscope (TEM) or utilizing a TEM and energy dispersive X-ray analysis (TEM-EDS). For example, when the negative active material is measured utilizing a TEM (or utilizing TEM-EDS), with a reference as a region in which a shadow (or shading) is changed, the inside of where the shadow (or shading) is the silicon particle core and the outside of where the shadow (or shading) is the oxide layer, a thickness from the region in which the shadow (or shading) is changed, to the outermost of the particle may be measured or determined as a thickness of the oxide layer. In some embodiments, by performing TEM-EDS analysis, a thickness from a point of inflection in which an amount of oxygen is drastically changed to the outermost may be measured or considered as a thickness of the oxide layer. For example, by performing TEM-EDS analysis, the distance from the outermost to the point of inflection in which an amount of oxygen is drastically changed from about 53 wt % to 0 wt % based on the total weight of the active material may be measured or considered as a thickness of the oxide layer.

The effects from the formation of the oxide layer with a thickness in a range of about 65 nm to about 450 nm according to one embodiment, and about 80 nm to about 450 nm according to another embodiment, may be obtained by applying it to a silicon particle core having a particle size of micrometers, for example, suitable or desired good initial efficiency and the stable cycle-life characteristics may be obtained by utilizing the core and the oxide layer described herein. As used herein, the terms "silicon particle core" and "core" may be used interchangeably. If the size of the silicon particles of the core is out of the micrometer range, for example, about 1 μm to about 10 μm, the effects due to the formation of the oxide layer with the thickness may not be obtained. Furthermore, the effects of using the core within the micrometer range, for example, about 1 μm to about 10 μm, may be obtained when the thickness of the oxide layer is in a range of about 65 nm to about 450 nm, and according to another embodiment, about 80 nm to about 450 nm.

Resultantly, the negative active material according to the one embodiment includes a core with a set or specific size and an oxide layer with a set or specific thickness. If at least one of the size of the core and the thickness of the oxide layer is not satisfied within the above ranges, good initial efficiency and a stable cycle-life characteristic may not be obtained.

The oxide in the oxide layer may be a silicon oxide, for example, $SiO_x$ ($0<x\leq2$).

In the negative active material according to one embodiment, the conductive layer may be continuously on the surface of the oxide layer in the form of a layer. When the conductive layer is further included, the ion conductivity may be improved, thereby improving the high-rate characteristic. The thickness of the conductive layer may be tens of nanometers, but it is not necessarily limited thereto.

The conductive layer may include a carbon-based material and the carbon-based material may include amorphous carbon. The amorphous carbon may include hard carbon, soft carbon, or a combination thereof.

An amount of oxygen in the negative active material may be in a range of about 5 wt % to about 20 wt % based on the total of 100 wt % of the negative active material. When the amount of oxygen is within the foregoing range, the initial efficiency and the excellent cycle-life characteristic may be obtained. The amount of oxygen refers to an amount calculated from an amount of oxygen included in silicon oxide, for example, $SiO_x$.

The negative active material according to one embodiment may be prepared by performing a primary heat treatment of silicon particles under an oxidizing atmosphere, mixing them with a carbon-based material, and performing a secondary heat-treatment.

By performing the heat treatment (e.g., the primary heat-treatment and/or secondary heat-treatment), the surface of the silicon particle is oxidized to form an oxide layer on a surface of a silicon particle core, resulting in preparation of the silicon particle core and the oxide layer on the surface of the silicon particle core.

The oxidizing atmosphere may be an oxygen-included atmosphere (e.g., an atmosphere that includes oxygen), and for example, the oxygen-included atmosphere may be a mixed atmosphere of oxygen and nitrogen gas, and herein, the concentration of oxygen in the oxygen-included atmosphere may be in a range of about 21% to about 30% and the rest may be nitrogen gas. If the concentration of oxygen is within the above range, the oxide layer having a suitable or desired oxygen amount may be more effectively formed. If the oxygen concentration is higher than the foregoing range, the oxide layer is formed at an extremely faster speed, such that an oxide layer exceeding a suitable or desired oxygen amount may be formed. If the oxygen concentration is lower than the range, the oxide is formed at an extremely slower speed, such that it may be difficult to provide an oxide layer having a suitable or desired oxygen amount.

The primary heat treatment may be performed at a temperature in a range of about 700° C. to about 1300° C. When the heat treatment is performed within the above temperature range, an oxide layer having a thickness in a range of about 65 nm to about 450 nm, or according to one embodiment, about 80 nm to about 450 nm, may be on the surface of the silicon particle core.

The silicon particle core may have a particle size in a range of about 1 μm to about 20 μm, or about 1 μm to about 10 μm. When the particle size of the silicon particle core is within the above range, abnormal growth of a crystal grain in the silicon particle core due to the primary heat treatment, for example, the primary heat treatment at a high temperature in a range of about 700° C. to about 1300° C., may not occur (or may substantially not occur). Rather, the size of the crystal grain of the silicon particle core may be reduced when the oxide layer (e.g., amorphous silicon oxide) is formed on the silicon particle core. If fine silicon particles having a particle size in a range of tens of nanometers are used when performing the primary heat treatment, abnormal growth of the crystal grain of the silicon particle core due to the primary heat treatment may occur, and the cycle-life characteristics of the resultant active material may be deteriorated or reduced.

The primary heat treatment may be performed for a time period in a range of about 4 hours to about 20 hours. When the primary heat treatment is performed for a time period in the above range, the thickness and the oxygen amount of the oxide layer may be satisfied in the suitable or desired ranges.

If any material such as LiF, etc., is also used to further prevent (or reduce a likelihood or degree of) the side-reaction between the silicon particle core and the electrolyte in the primary heat treatment, the final active material includes LiF which has low conductivity (e.g., low electrical conductivity), thereby causing inadequate or unsuitable occurrence of quick charging and discharging, so that it is not suitable as a quick and high-rate charge and discharge active material.

After the primary heat treatment is performed, the primarily heat treated product is mixed together with a carbon-based material. A mixing ratio of the primarily heat treated product and the carbon-based material may be a weight ratio in a range of about 99:1 to about 90:10. When the mixing ratio of the primarily heat treated product and the carbon-based material is within the above range, the ion conductivity may be suitably improved, without (or substantially without) a decrease in the capacity per unit weight.

The carbon-based material may include petroleum pitch, coal pitch, or a combination thereof.

The resulting mixture is secondarily heat treated to prepare a negative active material including a silicon particle core, an oxide layer on the surface of the silicon particle core, and a carbon layer on the oxide layer.

The secondary heat treatment may be performed at a temperature in a range of about 850° C. to about 1000° C. When the secondary heat treatment is performed in the above temperature range, impurities of the carbon-based material may be effectively removed, and thus, the deterioration of the irreversible capacity and the cycle-life characteristics due to the presence of impurities may not occur (or substantially may not occur) and the formation of a silicon carbide from the reaction of silicon with carbon, which does not participate in the charging and the discharging, may be prevented or reduced.

The secondary heat treatment may be performed under an inert atmosphere, and the inert atmosphere may be an atmosphere including $N_2$, argon, or a combination thereof.

As such, the negative active material according to one embodiment may be prepared by a simple process including heat treating under the oxidizing atmosphere and coating together with carbon, so that it is economical, as little cost is added based on the preparation process. If the oxidization of the silicon particle is performed by chemical oxidization using an oxidant instead of the above heat treatment, it may be allowable at a low temperature, so that a silicon oxide may be prepared while the silicon particle core that is crystalline and has a small size may be maintained. Such a prepared silicon oxide has an unstable structure and causes a large side reaction with the electrolyte and the amount of oxygen in the active material layer is the same as the amount of oxygen from the heat-oxidization according to embodiments of the present disclosure, but the oxide layer may be unsuitably or extremely thickened.

According to one embodiment, a rechargeable lithium battery including a negative electrode, a positive electrode, and an electrolyte is provided.

The negative electrode may include a current collector and a negative active material layer on the current collector, and the negative active material includes the negative active material according to one embodiment.

The negative active material layer may further include a carbon-based negative active material. The exemplary carbon-based negative active material may include a crystalline carbon, an amorphous carbon, or a combination thereof. The crystalline carbon may include graphite, such as an unspecified shaped, a sheet shaped, a flake shaped, a spherical shaped, or a fiber shaped natural graphite and/or artificial graphite, and the amorphous carbon may include soft carbon, hard carbon, mesophase pitch carbide, a sintered coke, and/or the like.

In the negative active material layer, the negative active material may be included in an amount in a range of 95 wt % to 99 wt % based on the total weight of the negative active material layer. If the negative active material layer includes both the negative active material according to one embodiment, for example, a silicon-based negative active material, and a carbon-based negative active material, the mixing ratio of the silicon-based negative active material to the carbon based negative active material may be a weight ratio in a range of about 5:95 to about 50:50. When the mixing ratio of the silicon-based negative active material and the carbon-based negative active material is within the above range, excellent initial efficiency and long cycle-life characteristics of the resultant active material may be concurrently (or simultaneously) realized.

The amount of oxygen in the negative active material layer may be in a range of about 0.2 wt % to about 8 wt % based on the total of 100 wt % of the negative active material. When the amount of oxygen in the negative active material is within the above range, the initial efficiency and the cycle-life characteristics of the resultant active material may both be excellent.

The negative electrode active material layer may include a binder, and may further optionally include a conductive material (e.g., an electrically conductive material). In the negative active material layer, an amount of the binder may be in a range of about 1 wt % to about 5 wt % based on the total weight of the negative active material layer. When the negative active material layer further includes the conductive material, the negative active material layer may include the negative active material in an amount in a range of about 90 wt % to about 98 wt %, the binder in an amount in a range of about 1 wt % to about 5 wt %, and the conductive material in an amount in a range of about 1 wt % to about 5 wt %.

The binder adheres negative active material particles to each other well and also adheres the negative active materials to the current collector. The binder may include a non-water-soluble binder, a water-soluble binder, or a combination thereof.

The non-water-soluble binder may include polyvinyl chloride, carboxylated polyvinylchloride, polyvinylfluoride, an ethylene oxide-included polymer, polyvinyl pyrrolidone, polyurethane, polytetrafluoroethylene, polyvinylidene fluoride, polyethylene, polypropylene, polyamideimide, polyimide, lithium polyacrylate, or a combination thereof.

The water-soluble binder may include a styrene-butadiene rubber, an acrylated styrene-butadiene rubber, an acrylonitrile-butadiene rubber, an acryl rubber, a butyl rubber, a fluorine rubber, an ethylene propylene copolymer, polyepichlorohydrin, polyphosphazene, polyacrylonitrile, polystyrene, an ethylene propylene diene copolymer, polyvinyl pyridine, chlorosulfonated polyethylene, latex, a polyester resin, an acryl resin, a phenol resin, an epoxy resin, polyvinyl alcohol, or a combination thereof.

When the water-soluble binder is used as a negative electrode binder, a cellulose-based compound may be further used to provide viscosity as a thickener. The cellulose-based compound includes one or more of carboxymethyl cellulose, hydroxypropyl methyl cellulose, methyl cellulose, or alkali metal salts thereof. The alkali metals may be Na, K, or Li. The thickener may be included in an amount in a range of 0.1 parts by weight to 3 parts by weight based on 100 parts by weight of the negative active material.

The conductive material is included to provide electrode conductivity (e.g., electrical conductivity), and any suitable electrically conductive material may be used as a conductive material unless it causes a chemical change (e.g., an undesirable chemical change in the rechargeable lithium battery). Examples of the conductive material include: a carbon-based material such as natural graphite, artificial graphite, carbon black, acetylene black, ketjen black, denka black, a carbon fiber, and the like; a metal-based material of a metal powder or a metal fiber including copper, nickel, aluminum, silver, and the like; a conductive polymer such as a polyphenylene derivative; or a mixture thereof.

The current collector may include one selected from a copper foil, a nickel foil, a stainless steel foil, a titanium foil, a nickel foam, a copper foam, a polymer substrate coated with a conductive metal, and a combination thereof, but is not limited thereto.

The negative electrode may be prepared by mixing a negative active material, a cellulose-based compound, a binder, and optionally a conductive material in a solvent to prepare an active material composition, and coating the composition on a current collector. The solvent may be water.

Such a negative electrode preparation should be readily apparent to those or ordinary skill in the art upon a review of the present disclosure, and therefore, a further detailed description thereof is not necessary here.

The positive electrode may include a positive current collector and a positive active material layer on the positive current collector.

The positive active material may include compounds that reversibly intercalate and deintercalate lithium ions (e.g., lithiated intercalation compounds). In some embodiments, the positive active material may include one or more composite oxides of a metal selected from cobalt, manganese, nickel, and a combination thereof, and lithium. Examples thereof may include compounds represented by one of the following chemical formulae. $Li_aA_{1-b}X_bD_2$ ($0.90 \leq a \leq 1.8$, $0 \leq b \leq 0.5$); $Li_aA_{1-b}X_bO_{2-c}D_c$ ($0.90 \leq a \leq 1.8$, $0 \leq b \leq 0.5$, $0 \leq c \leq 0.05$); $Li_aE_{1-b}X_bO_{2-c}D_c$ ($0.90 \leq a \leq 1.8$, $0 \leq b \leq 0.5$, $0 \leq c \leq 0.05$); $Li_aE_{2-b}X_bO_{4-c}D_c$ ($0.90 \leq a \leq 1.8$, $0 \leq b \leq 0.5$, $0 \leq c \leq 0.05$); $Li_aNi_{1-b-c}Co_bX_cD_\alpha$ ($0.90 \leq a \leq 1.8$, $0 \leq b \leq 0.5$, $0 \leq c \leq 0.5$, $0 \leq \alpha \leq 2$); $Li_aNi_{1-b-c}Co_bX_cO_{2-\alpha}T_\alpha$ ($0.90 \leq a \leq 1.8$, $0 \leq b \leq 0.5$, $0 \leq c \leq 0.05$, $0 \leq \alpha \leq 2$); $Li_aNi_{1-b-c}Co_bX_cO_{2-\alpha}T_2$ ($0.90 \leq a \leq 1.8$, $0 \leq b \leq 0.5$, $0 \leq c \leq 0.05$, $0 \leq \alpha \leq 2$); $Li_aNi_{1-b-c}Mn_bX_cD_\alpha$ ($0.90 \leq a \leq 1.8$, $0 \leq b \leq 0.5$, $0 \leq c \leq 0.05$, $0 \leq \alpha \leq 2$); $Li_aNi_{1-b-c}Mn_bX_cO_{2-\alpha}T_\alpha$ ($0.90 \leq a \leq 1.8$, $0 \leq b \leq 0.5$, $0 \leq c \leq 0.05$, $0 \leq \alpha \leq 2$); $Li_aNi_{1-b-c}Mn_bX_cO_{2-\alpha}T_2$ ($0.90 \leq a \leq 1.8$, $0 \leq b \leq 0.5$, $0 \leq c \leq 0.05$, $0 \leq \alpha \leq 2$); $Li_aNi_bE_cG_dO_2$ ($0.90 \leq a \leq 1.8$, $0 \leq b \leq 0.9$, $0 \leq c \leq 0.5$, $0.001 \leq d \leq 0.1$); $Li_aNi_bCo_cMn_dG_eO_2$ ($0.90 \leq a \leq 1.8$, $0 \leq b \leq 0.9$, $0 \leq c \leq 0.5$, $0 \leq d \leq 0.5$, $0.001 \leq e \leq 0.1$); $Li_aNiG_bO_2$ ($0.90 \leq a \leq 1.8$, $0.001 \leq b \leq 0.1$); $Li_aCoG_bO_2$ ($0.90 \leq a \leq 1.8$, $0.001 \leq b \leq 0.1$); $Li_aMn_{1-b}G_bO_2$ ($0.90 \leq a \leq 1.8$, $0.001 \leq b \leq 0.1$); $Li_aMn_2G_bO_4$ ($0.90 \leq a \leq 1.8$, $0.001 \leq b \leq 0.1$); $Li_aMn_{1-g}G_gPO_4$ ($0.90 \leq a \leq 1.8$, $0 \leq g \leq 0.5$); $QO_2$; $QS_2$; $LiQS_2$; $V_2O_5$; $LiV_2O_5$; $LiZO_2$; $LiNiVO_4$; $Li_{(3-f)}J_2 PO_{43}$ ($0 \leq f \leq 2$); $Li_{(3-f)}Fe_2 PO_{43}$ ($0 \leq f \leq 2$); and $Li_aFePO_4$ ($0.90 \leq a \leq 1.8$).

In the chemical formulae above, A is selected from Ni, Co, Mn, and a combination thereof; X is selected from Al, Ni, Co, Mn, Cr, Fe, Mg, Sr, V, a rare earth element, and a combination thereof; D is selected from O, F, S, P, and a combination thereof; E is selected from Co, Mn, and a combination thereof; T is selected from F, S, P, and a combination thereof; G is selected from Al, Cr, Mn, Fe, Mg, La, Ce, Sr, V, and a combination thereof; Q is selected from Ti, Mo, Mn, and a combination thereof; Z is selected from Cr, V, Fe, Sc, Y, and a combination thereof; and J is selected from V, Cr, Mn, Co, Ni, Cu, and a combination thereof.

The compounds may have a coating layer on the surface, or may be mixed with another compound having a coating layer. The coating layer may include at least one coating element compound selected from an oxide of a coating element, a hydroxide of the coating element, an oxyhydroxide of the coating element, an oxycarbonate of the coating element, and a hydroxyl carbonate of the coating element. The compound for the coating layer may be amorphous and/or crystalline. The coating element included in the coating layer may include Mg, Al, Co, K, Na, Ca, Si, Ti, V, Sn, Ge, Ga, B, As, Zr, or a mixture thereof. The coating layer may be applied or formed utilizing a method having no (or substantially no) adverse influence on properties of a positive active material by using these elements in the compound. For example, the method may include any suitable coating method such as spray coating, dipping, and/or the like. Such a method would be readily apparent to those of ordinary skill in the art upon reviewing the present disclosure, and therefore, it is not necessary to describe the method in more detail.

In the positive electrode, an amount of the positive active material may be in a range of 90 wt % to 98 wt % based on the total weight of the positive active material layer.

In one embodiment, the positive active material layer may further include a binder and a conductive material (e.g., an electrically conductive material). Herein, each amount of the binder and the conductive material may be in a range of about 1 wt % to about 5 wt %, respectively, based on a total amount of the positive active material layer.

The binder improves binding properties of positive active material particles with one another and with a current collector. Examples of the binder may include polyvinyl alcohol, carboxymethyl cellulose, hydroxypropyl cellulose, diacetyl cellulose, polyvinylchloride, carboxylated polyvinyl chloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and the like, but are not limited thereto.

The conductive material is included to provide electrode conductivity (e.g., electrical conductivity). Any suitable electrically conductive material may be used as a conductive material unless it causes a chemical change in a battery (e.g., an undesirable chemical change in the rechargeable lithium battery). Examples of the conductive material include a carbon-based material such as natural graphite, artificial graphite, carbon black, acetylene black, ketjen black, a carbon fiber, and the like; a metal-based material of a metal powder or a metal fiber including copper, nickel, aluminum, silver, and the like; a conductive polymer such as a polyphenylene derivative; or a mixture thereof.

The current collector may include an aluminum foil, a nickel foil, or a combination thereof, but is not limited thereto.

The positive electrode may be prepared by mixing a positive active material, a binder, and optionally a conductive material in a solvent to prepare an active material composition and coating the active material composition on a current collector. Such a positive electrode preparation should be readily apparent to those of ordinary skill in the art upon review of the present disclosure, and therefore, further detailed description thereof is not necessary here. The solvent may include N-methyl pyrrolidone, but is not limited thereto.

The electrolyte may include a non-aqueous organic solvent and a lithium salt.

The non-aqueous organic solvent serves as a medium for transmitting ions taking part in the electrochemical reaction of a battery.

The non-aqueous organic solvent may include a carbonate-based, ester-based, ether-based, ketone-based, alcohol-based, and/or aprotic solvent.

The carbonate-based solvent may include dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), butylene carbonate (BC), and/or the like. The ester-based solvent may include methyl acetate, ethyl acetate, n-propyl acetate, t-butyl acetate, methylpropionate, ethylpropionate, propyl propionate, γ-butyrolactone, decanolide, valerolactone, mevalonolactone, caprolactone, and/or the like. The ether-based solvent may include dibutyl ether, tetraglyme, diglyme, dimethoxyethane, 2-m ethyltetrahydrofuran, tetrahydrofuran and/or the like. The ketone-based solvent may include cyclohexanone and/or the like. The alcohol-based solvent may include ethanol, isopropyl alcohol, and/or the like, and the aprotic solvent may include nitriles such as R—CN (wherein R is a hydrocarbon group having a C2 to C20 linear, branched, or cyclic structure and may include a double bond, an aromatic ring, and/or an ether bond) and/or the like, dioxolanes such as 1,3-dioxolane and/or the like, and sulfolanes and/or the like.

The non-aqueous organic solvent may be used alone or in a mixture. When the organic solvent is used in a mixture, the mixture ratio may be controlled in accordance with a suitable or desirable battery performance.

The carbonate-based solvent may desirably be a mixture of a cyclic carbonate and a chain carbonate. In this case, the cyclic carbonate and the chain carbonate may be mixed and used in a volume ratio in a range of 1:1 to 1:9, such that the performance of the electrolyte may be improved.

When the non-aqueous organic solvent is used in a mixture, a mixed solvent of a cyclic carbonate and a chain carbonate; a mixed solvent of a cyclic carbonate and a propionate-based solvent; or a mixed solvent of a cyclic carbonate, a chain carbonate, and a propionate-based solvent may be used. The propionate-based solvent may include methyl propionate, ethyl propionate, propyl propionate, or a combination thereof.

Herein, when the cyclic carbonate and the chain carbonate or the cyclic carbonate and the propionate-based solvent are mixed, they may be mixed to a volume ratio in a range of about 1:1 to about 1:9, and thus, performance of an electrolyte solution may be improved. In addition, when the cyclic carbonate, the chain carbonate, and the propionate-based solvent are mixed, they may be mixed to a volume ratio in a range of about 1:1:1 to about 3:3:4. The mixing ratios of the solvents may be suitably or appropriately adjusted according to suitable or desirable properties.

The non-aqueous organic solvent may further include an aromatic hydrocarbon-based organic solvent in addition to the carbonate-based solvent. Herein, the carbonate-based solvent and the aromatic hydrocarbon-based organic solvent may be mixed to a volume ratio in a range of about 1:1 to about 30:1.

The aromatic hydrocarbon-based organic solvent may include an aromatic hydrocarbon-based compound represented by Chemical Formula 1.

Chemical Formula 1

In Chemical Formula 1, $R_1$ to $R_6$ are the same or different and are selected from hydrogen, a halogen, a C1 to C10 alkyl group, a haloalkyl group, and a combination thereof.

Examples of the aromatic hydrocarbon-based organic solvent may be selected from benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 2,3-difluorotoluene, 2,4-difluorotoluene, 2,5-difluorotoluene, 2,3,4-trifluorotoluene, 2,3,5-trifluorotoluene, chlorotoluene, 2,3-dichlorotoluene, 2,4-dichlorotoluene, 2,5-dichlorotoluene, 2,3,4-trichlorotoluene, 2,3,5-trichlorotoluene, iodotoluene, 2,3-diiodotoluene, 2,4-diiodotoluene, 2,5-diiodotoluene, 2,3,4-triiodotoluene, 2,3,5-triiodotoluene, xylene, and a combination or mixture thereof.

The electrolyte may further include vinylene carbonate and/or an ethylene carbonate-based compound represented by Chemical Formula 2 as an additive for improving the cycle-life of the resultant battery.

Chemical Formula 2

In Chemical Formula 2, $R_7$ and $R_8$ are the same or different and are selected from hydrogen, a halogen, a cyano group (CN), a nitro group ($NO_2$), and a fluorinated C1 to C5 alkyl group, provided that at least one of $R_7$ and $R_8$ is a halogen, a cyano group (CN), a nitro group ($NO_2$), or a fluorinated C1 to C5 alkyl group, and both of $R_7$ and $R_8$ are not hydrogen.

Examples of the ethylene carbonate-based compound may include difluoroethylene carbonate, chloroethylene carbonate, dichloroethylene carbonate, bromoethylene carbonate, dibromoethylene carbonate, nitroethylene carbonate, cyanoethylene carbonate, and/or fluoroethylene carbonate.

The amount of the additive for improving the cycle-life may be used within a suitable or appropriate range.

The electrolyte may further include vinyl ethylene carbonate, propane sultone, succinonitrile, or a combination thereof, and the amount thereof may be suitably controlled.

The lithium salt dissolved in the organic solvent supplies lithium ions in a battery, enables a basic operation of a rechargeable lithium battery, and improves transportation of the lithium ions between positive and negative electrodes. Examples of the lithium salt include at least one supporting salt selected from $LiPF_6$, $LiBF_4$, $LiSbF_6$, $LiAsF_6$, $LiN(SO_2C_2F_5)_2$, $Li(CF_3SO_2)_2N$, $LiN(SO_3C_2F_5)_2$, $Li(FSO_2)_2N$ (lithium bis(fluorosulfonyl)imide LiFSI), $LiC_4F_9SO_3$, $LiClO_4$, $LiAlO_2$, $LiAlCl_4$, $LiPO_2F_2$, $LiN(C_xF_{2x+1}SO_2)(C_yF_{2y+1}SO_2)$ (wherein, x and y are natural numbers, for example, an integer of 0 to 20), lithium difluoro(bisoxolato) phosphate, LiCl, LiI, $LiB(C_2O_4)_2$ (lithium bis(oxalato) borate: LiBOB), and lithium difluoro(oxalate) borate (LiDFOB). The lithium salt may be used in a concentration in a range of 0.1 M to 2.0 M. When the lithium salt is included at the above concentration range, an electrolyte may have excellent performance and lithium ion mobility due to suitable or optimal electrolyte conductivity and viscosity.

A separator may be between the positive electrode and the negative electrode depending on a type (or kind) of the lithium secondary battery. Such a separator may include polyethylene, polypropylene, polyvinylidene fluoride, and/or multi-layers thereof such as a polyethylene/polypropylene double-layered separator, a polyethylene/polypropylene/polyethylene triple-layered separator, a polypropylene/polyethylene/polypropylene triple-layered separator, and/or the like.

Figure 2:
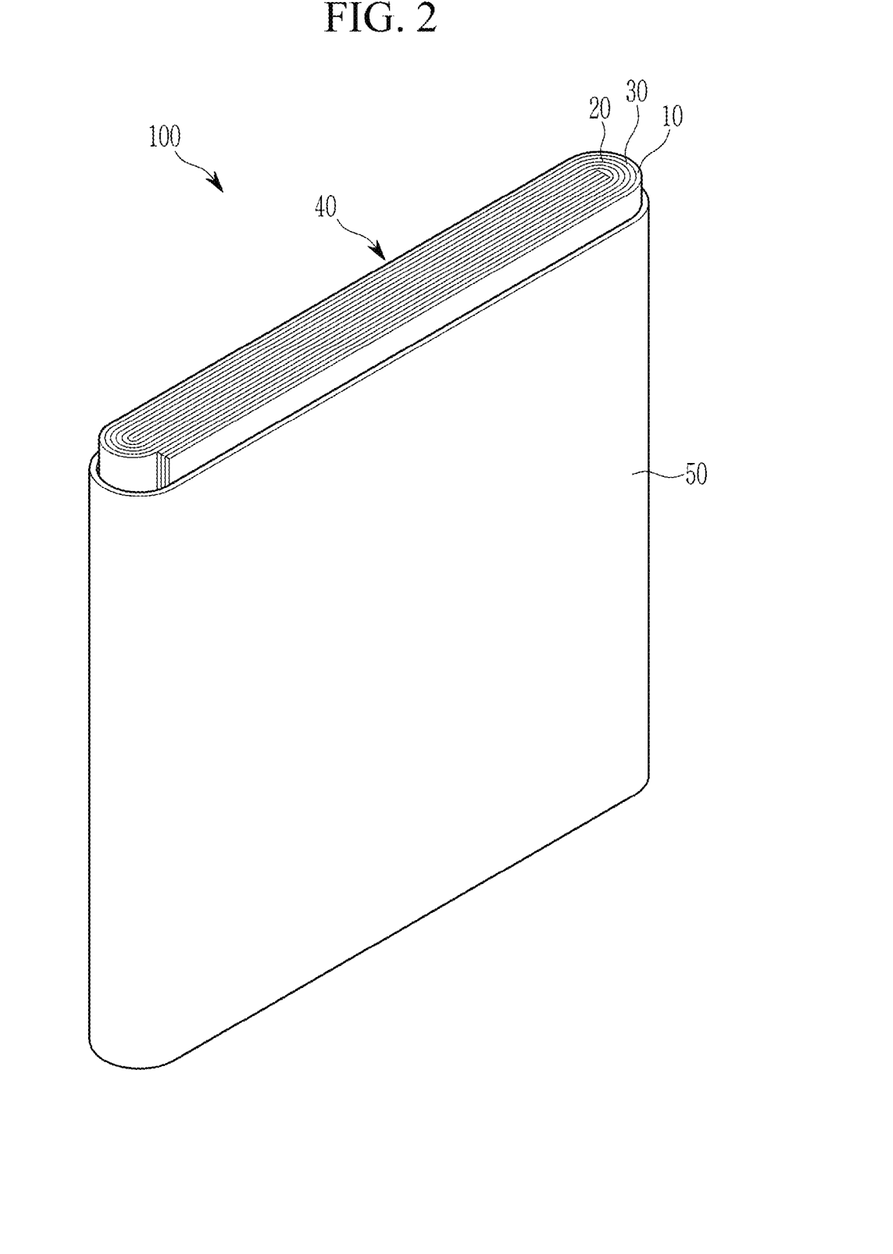
FIG. 2 is cross-sectional view showing a structure of an electrode according to one embodiment.

FIG. 2 is an exploded perspective view of a lithium secondary battery according to an embodiment. The lithium secondary battery according to an embodiment is illustrated as a prismatic battery, but is not limited thereto, and may include variously-shaped batteries such as a cylindrical or pouch-type battery (e.g., a pouch-shaped battery).

Referring to FIG. 2, a lithium secondary battery 100 according to an embodiment includes an electrode assembly 40 manufactured by winding a separator 30 interposed between a positive electrode 10 and a negative electrode 20, and a case 50 housing the electrode assembly 40. The positive electrode 10, the negative electrode 20, and the separator 30 may be impregnated with an electrolyte solution.

Hereinafter, examples of the present disclosure and comparative examples are described. These examples, however, are not in any sense to be interpreted as limiting the scope of the disclosure.

Example 1

Silicon particles having a particle size of 5 μm were primarily heat treated at 800° C. for 5 hours under an oxidizing atmosphere including a concentration of 21 vol % of oxygen and 89 vol % of nitrogen, based on the total volume of the oxidizing atmosphere, to prepare a silicon oxide ($SiO_x$, x=2) layer on the surface of the silicon particle core. Thereafter, 95 wt % of the obtained product and 5 wt % of petroleum pitch were mixed, and the mixed product was secondarily heat treated at 950° C. for 5 hours to prepare a silicon-based negative active material in which a silicon oxide ($SiO_x$, x=2) and a soft carbon conductive layer were sequentially on the surface of the silicon particles. In the prepared silicon-based negative active material, the amount of oxygen was 5 wt % based on the total of 100 wt % of the negative active material, and the thickness of the silicon oxide layer was 82 nm.

97 wt % of the mixed negative active material silicon-based negative active material and a carbon-based negative active material (artificial graphite) (5:95 wt %), 1.5 wt % of a styrene-butadiene rubber binder, and 1 wt % of carboxylmethyl cellulose as an agent for increasing viscosity were mixed in a water solvent to prepare a negative active material slurry.

The produced negative active material slurry was coated on a Cu current collector, dried, and compressed to produce a negative electrode including a negative active material layer on the current collector. In the negative electrode, the amount of oxygen included in the negative active material layer was 0.3 wt % based on the total of 100 wt % of the negative active material layer.

Example 2

Silicon particles having a particle size of 5 μm were primarily heat treated at 800° C. for 9 hours under a oxidizing atmosphere including a concentration of 21 vol % of oxygen and 89 vol % of nitrogen, based on the total volume of the oxidizing atmosphere, to prepare a silicon oxide ($SiO_x$, x=2) layer on the surface of the silicon particle core. Thereafter, 95 wt % of the obtained product and 5 wt % of petroleum pitch were mixed, and the mixed product was secondarily heat treated at 950° C. for 5 hours to prepare a silicon-based negative active material in which a silicon oxide ($SiO_x$, x=2) and a soft carbon conductive layer were sequentially on the surface of the silicon particles. In the prepared silicon-based negative active material, the amount of oxygen was 10 wt % based on the total of 100 wt % of the negative active material, and the thickness of the silicon oxide layer was 211 nm.

Using the silicon-based negative active material and the carbon-based negative active material (artificial graphite) used in the Example 1, a negative electrode was prepared by substantially the same procedure as in Example 1. The amount of oxygen was 0.6 wt % based on the total of 100 wt % of the negative active material in the negative active material layer of the prepared negative electrode.

Example 3

Silicon particles having a particle size of 5 μm were primarily heat treated at 800° C. for 15 hours under an oxidizing atmosphere including a concentration of 21 vol % of oxygen and 89 vol % of nitrogen, based on the total volume of the oxidizing atmosphere, to prepare a silicon oxide ($SiO_x$, x=2) layer on the surface of the silicon particle core. Thereafter, 95 wt % of the obtained product and 5 wt % of petroleum pitch were mixed, and the mixed product was secondarily heat treated at 950° C. for 5 hours to prepare a silicon-based negative active material in which a silicon oxide ($SiO_x$, x=2) and a soft carbon conductive layer were sequentially on the surface of the silicon particle. In the prepared silicon-based negative active material, the amount of oxygen was 20 wt % based on the total of 100 wt % of the negative active material, and the thickness of the silicon oxide layer was 446 nm.

Using the silicon-based negative active material and the carbon-based negative active material (artificial graphite) used in Example 1, a negative electrode was prepared by substantially the same procedure as in Example 1. The amount of oxygen was 1.2 wt % based on the total of 100 wt % of the negative active material in the negative active material layer of the prepared negative electrode.

Comparative Example 1

Silicon particles having a particle size of 5 μm were primarily heat treated at 800° C. for 3 hours under an oxidizing atmosphere including a concentration of 21 vol % of oxygen and 89 vol % of nitrogen, based on the total volume of the oxidizing atmosphere, to prepare a silicon oxide ($SiO_x$, x=2) layer on the surface of the silicon particle core. Thereafter, 95 wt % of the obtained product and 5 wt % of petroleum pitch were mixed, and the mixed product was secondarily heat treated at 950° C. for 5 hours to prepare a silicon-based negative active material in which a silicon oxide ($SiO_x$, x=2) and a soft carbon conductive layer were sequentially on the surface of the silicon particles. In the prepared silicon-based negative active material, the amount of oxygen was 2.5 wt % based on the total of 100 wt % of the negative active material, and the thickness of the silicon oxide layer was 43 nm.

Using the silicon-based negative active material and the carbon-based negative active material (artificial graphite) used in Example 1, a negative electrode was prepared by substantially the same procedure as in Example 1. The amount of oxygen was 0.1 wt % based on the total of 100 wt % of the negative active material in the negative active material layer of the prepared negative electrode.

Comparative Example 2

Silicon particles having a particle size of 5 μm were primarily heat treated at 800° C. for 30 hours under an oxidizing atmosphere including a concentration of 21 vol % of oxygen and 89 vol % of nitrogen, based on the total volume of the oxidizing atmosphere, to prepare a silicon oxide ($SiO_x$, x=2) layer on the surface of the silicon particle core. Thereafter, 95 wt % of the obtained product and 5 wt % of petroleum pitch were mixed, and the mixed product was secondarily heat treated at 950° C. for 5 hours to prepare a silicon-based negative active material in which a silicon oxide ($SiO_x$, x=2) and a soft carbon conductive layer were sequentially on the surface of the silicon particles. In the prepared silicon-based negative active material, the amount of oxygen was 30 wt % based on the total of 100 wt % of the negative active material, and the thickness of the silicon oxide layer was 508 nm.

Using the silicon-based negative active material and the carbon-based negative active material (artificial graphite) used in Example 1, a negative electrode was prepared by substantially the same procedure as in Example 1. The amount of oxygen was 9 wt % based on the total 100 wt % of the negative active material in the negative active material layer of the prepared negative electrode.

TEM Photograph

Figure 3:
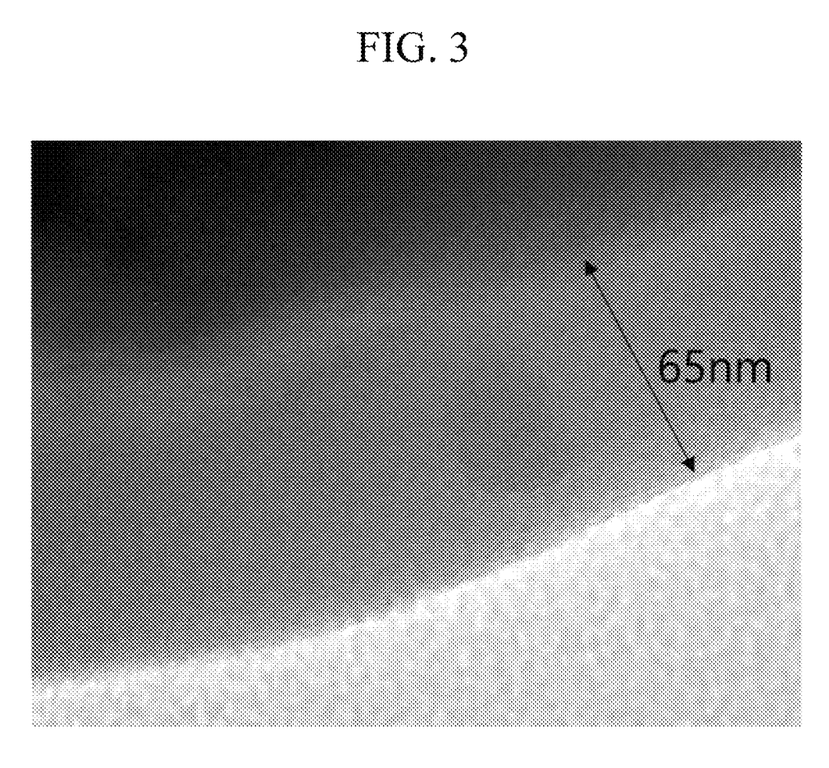
FIG. 3 is a TEM photograph (image) of the negative active material according to Example 1.
Figure 4:
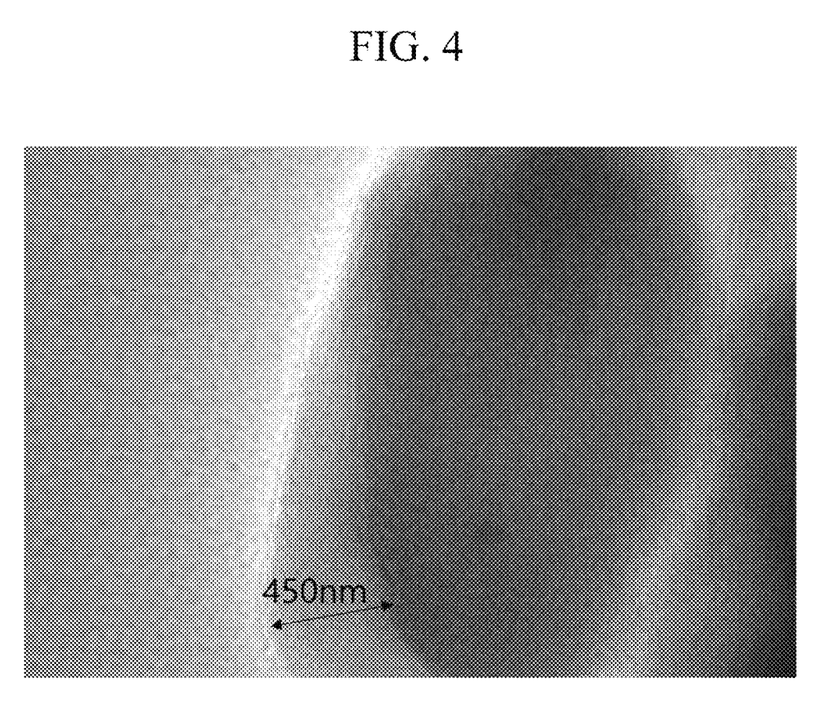
FIG. 4 is a TEM photograph (image) of the negative active material according to Example 2.

Regarding the surface of the negative active material of Examples 1 and 2, TEM photographs (images) were captured, and the results are shown in FIGS. 3 and 4, respectively. As shown in FIG. 3 and FIG. 4, the regions in which the shadows of the particles were changed, were present, and among these, the darker black indicated the core portion (the silicon particle core) and the brighter region indicated the oxide layer portion.

Thus, as shown in FIG. 3, the oxide layer was found to have a thickness of 65 nm in the negative active material layer of Example 1, and as shown in FIG. 4, the oxide layer was found to have a thickness of 450 nm in the negative active material layer of Example 2.

Fabrication of Cell

In each of the negative electrodes according Examples 1 to 3 and Comparative Examples 1 and 2, a positive electrode including a $LiNi_{0.88}Co_{0.1}Al_{0.02}O_2$ positive active material and an electrolyte was used to fabricate rechargeable lithium cells according to the general method. As the electrolyte, 5 volume % of fluoroethylene carbonate added to 100 volume % of 1.5M $LiPF_6$ dissolved in a mixed solvent of ethylene carbonate, diethyl carbonate, and dimethyl carbonate (3/5/2 volume ratio) was used.

Measurement of Initial Efficiency

The cells were formation charged and discharged at 0.2 C once to measure the formation charge and discharge capacity. From these results, the initial efficiency was obtained. The results are shown in Table 1.

Measurement of Capacity Retention

The cells were charged and discharged at 1 C 500 times and the 1st discharge capacity and the $500^{th}$ discharge capacity were measured. From these results, the ratio of the $500^{th}$ discharge capacity relative to the 1st discharge capacity was calculated. The results are shown in Table 1.

TABLE 1

| | Amount of oxygen (wt %) | Thickness of oxide layer (nm) | Initial efficiency (%) | $500^{th}$ capacity retention (%) |
|---|---|---|---|---|
| Comparative Example 1 | 2.5 | 43 | 90 | 17 |
| Example 1 | 5 | 82 | 89 | 74 |
| Example 2 | 10 | 211 | 87 | 82 |
| Example 3 | 20 | 446 | 85 | 88 |
| Comparative Example 2 | 30 | 508 | 79 | 89 |

As shown in Table 1, Examples 1 to 3 including the oxide layer having a thickness of 82 nm to 446 nm exhibited excellent capacity retention of 74% to 88%, while they exhibited excellent initial efficiency of 85% to 89%. Whereas, Comparative Example 1 including the oxide layer having a very thin thickness of 43 nm exhibited good initial efficiency of 90%, but surprisingly deteriorated capacity retention of 17%, and Comparative Example 2 including the oxide layer having a very thick thickness of 508 nm exhibited good capacity retention of 89%, but had deteriorated initial efficiency of 79% which was found to be an extremely low value in the related art, and thus, it is not desirable.

While the subject matter of this disclosure has been described in connection with what is presently considered to be practical exemplary embodiments, it is to be understood that the present disclosure is not limited to the disclosed embodiments. On the contrary, it is intended to cover various modifications and equivalent arrangements included within the spirit and scope of the appended claims.

What is claimed is:

1. A negative active material for a rechargeable lithium battery, comprising:
   a silicon particle core comprising a silicon particle having a particle size in a micrometer range;
   an oxide layer having a thickness in a range of about 65 nm to about 450 nm, on the silicon particle core; and
   a conductive layer on the oxide layer,
   wherein the oxide layer comprises $SiO_x$, $0<x\leq2$.

2. The negative active material for the rechargeable lithium battery of claim 1, wherein the silicon particle core has a particle size in a range of about 1 µm to about 10 µm.

3. The negative active material for the rechargeable lithium battery of claim 1, wherein the oxide layer has a thickness in a range of about 80 nm to about 450 nm.

4. The negative active material for the rechargeable lithium battery of claim 1, wherein the oxide layer is continuously on a surface of the silicon particle core.

5. The negative active material for the rechargeable lithium battery of claim 1, wherein the negative active material comprises oxygen at an amount in a range of about 5 wt % to about 20 wt % based on the total of 100 wt % of the negative active material in the negative active material.

6. The negative active material for the rechargeable lithium battery of claim 1, wherein the conductive layer includes a carbon-based material.

7. The negative active material for the rechargeable lithium battery of claim 6, wherein the carbon-based material comprises hard carbon, soft carbon, or a combination thereof.

8. A rechargeable lithium battery, comprising:
   a negative electrode including the negative active material of claim 1;
   a positive electrode; and
   an electrolyte.

9. The rechargeable lithium battery of claim 8, wherein the negative electrode further comprises a carbon-based negative active material.

* * * * *